US012614011B2

(12) United States Patent
Coudert et al.

(10) Patent No.: US 12,614,011 B2
(45) Date of Patent: Apr. 28, 2026

(54) BALANCED SUBDIVISION OF CIRCUITS FOR HARDWARE EMULATION ASSISTED SIMULATION

(71) Applicant: Synopsys, Inc., Sunnyvale, CA (US)

(72) Inventors: Olivier Coudert, Sunnyvale, CA (US); Kiran Ramchandra Lokhande, Bangalore (IN); Prashant Kumar Mishra, Bangalore (IN)

(73) Assignee: Synopsys, Inc., Sunnyvale, CA (US)

( * ) Notice: Subject to any disclaimer, the term of this patent is extended or adjusted under 35 U.S.C. 154(b) by 614 days.

(21) Appl. No.: 18/178,976

(22) Filed: Mar. 6, 2023

(65) Prior Publication Data

US 2024/0303403 A1     Sep. 12, 2024

(51) Int. Cl.
| | |
|---|---|
| *G06F 30/33* | (2020.01) |
| *G06F 30/331* | (2020.01) |
| *G06F 30/3312* | (2020.01) |
| *G06F 30/392* | (2020.01) |
| *G06F 119/12* | (2020.01) |

(52) U.S. Cl.
CPC ........ G06F 30/3312 (2020.01); G06F 30/392 (2020.01); *G06F 2119/12* (2020.01)

(58) Field of Classification Search
CPC .............. G06F 30/3312; G06F 30/392; G06F 2119/12; G06F 30/33; G06F 30/331; G06F 30/3308
See application file for complete search history.

(56) References Cited

U.S. PATENT DOCUMENTS

| | | | |
|---|---|---|---|
| 10,990,734 B1* | 4/2021 | Safe | ................... G06F 30/3323 |
| 2016/0098505 A1* | 4/2016 | Larzul | .................. G06F 30/331 703/15 |

* cited by examiner

*Primary Examiner* — Nghia M Doan
(74) *Attorney, Agent, or Firm* — Weaver Austin Villeneuve & Sampson LLP

(57)           ABSTRACT
Disclosed are techniques for simulation of a circuit design using a set of primary signals captured by a hardware emulation system. In preparation for simulation, the circuit design is divided into partitions that are substantially uniform in size. Sequential dependencies are then identified based on signals that cross partitions. The set of primary signals includes signals that, when provided as input to the simulation, break the sequential dependencies such that each partition can be simulated independently. Techniques for determining which signals to include in the set of primary signals are also disclosed. The hardware emulation system is configured to capture values of the primary signals as part of emulating the circuit design. Afterwards, the simulation is performed using the captured values. During the simulation, non-primary signals are reconstructed using values obtained from simulating each partition independently.

20 Claims, 12 Drawing Sheets

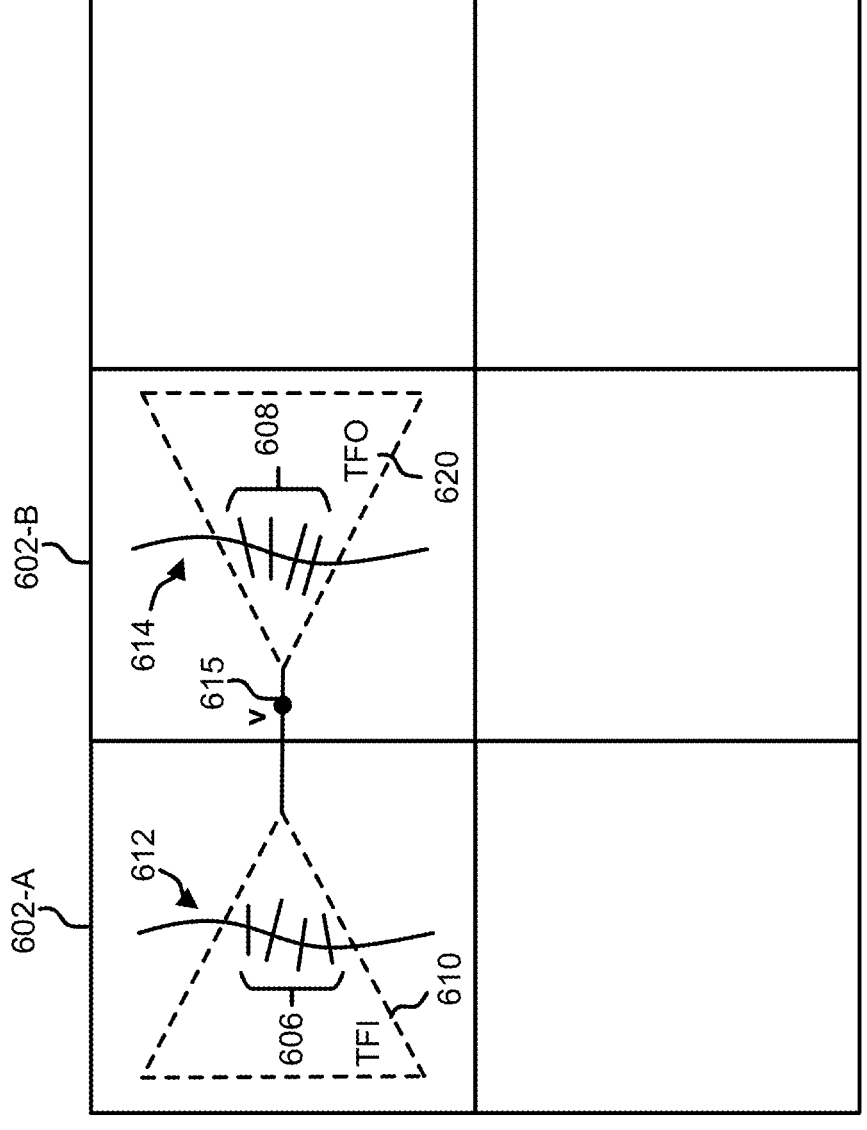
FIG. 6

800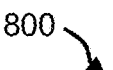

```
┌──────────────────────────────────────────────┐
│ Divide a circuit design into substantially     │──── 802
│ uniform-sized partitions                        │
└──────────────────────────────────────────────┘
                      │
                      ▼
┌──────────────────────────────────────────────┐
│ Identify sequential dependencies based on      │──── 804
│ signals that cross partitions                   │
└──────────────────────────────────────────────┘
                      │
                      ▼
┌──────────────────────────────────────────────┐
│ Determine a set of primary signals that, when   │
│ provided as input to the simulation, break the  │
│ sequential dependencies such that each          │──── 806
│ partition can be simulated independently, where │
│ the set of primary signals includes a subset of │
│ the signals that cross the partitions           │
└──────────────────────────────────────────────┘
                      │
                      ▼
┌──────────────────────────────────────────────┐
│ Configure a hardware-based emulation system to  │
│ capture values of the set of primary signals    │──── 808
│ during emulation of the circuit design          │
└──────────────────────────────────────────────┘
                      │
                      ▼
┌──────────────────────────────────────────────┐
│ Perform simulation using captured values. As    │
│ part of simulating the circuit design,          │
│ reconstruct signals not included in the set of  │──── 810
│ primary signals using values obtained from      │
│ simulating each partition independently         │
└──────────────────────────────────────────────┘
```

Product Idea 1010

EDA Processes 1012

System Design 1014

Logical Design and Functional Verification 1016

Synthesis and Design for Test 1018

Netlist Verification 1020

Design Planning 1022

Physical Implementation 1024

Analysis and Extraction 1026

Physical Verification 1028

Resolution Enhancement 1030

Mask Data Preparation 1032

Tape Out 1034

Fabrication 1036

Packaging & Assembly 1038

Manufactured Chips 1040

1100

BALANCED SUBDIVISION OF CIRCUITS FOR HARDWARE EMULATION ASSISTED SIMULATION

TECHNICAL FIELD

The present disclosure generally relates to testing and analysis of circuit designs. More particularly, the present disclosure relates to simulating the behavior of a circuit design using signal information obtained through hardware emulation.

BACKGROUND

Circuit designers may use simulation for testing and analysis of their circuit designs. For example, a simulation program may be executed by a processing device (e.g., a processor) to verify that a design under test (DUT) operates as expected or to analyze power consumption of the DUT. The DUT can then be modified based on the results of the simulation, e.g., to correct a design error or to optimize one or more circuit elements for reduced power consumption. As circuit designs grow in size and become more complex, the amount of time and computing resources (e.g., processing units, memory) needed to simulate an entire design increase to the point where pure simulation is no longer acceptable. For example, it may be impractical to wait several days or weeks for a simulation program to finish computing the values of all the signals associated with the design. Such signals can number in the millions or even billions since these signals typically include not only the overall outputs of the design, but also internal signals that provide insight into the behavior of individual circuit elements.

One alternative to simulation is emulation, which involves the use of hardware to reproduce circuit behavior. Different emulation architectures exist, some of which are based on field programmable gate arrays (FPGAs). Although emulation can typically be performed much faster than simulation, emulation has its own disadvantages. For instance, additional hardware resources are needed to capture the values of signals produced by the emulation hardware. Depending on the architecture of the emulator, these additional hardware resources may compete with the hardware resources used to emulate the DUT, which can result in worsening of emulator performance. Further, the amount of signal values that are captured by the hardware may exceed the bandwidth available for reading captured values out of the emulator (e.g., the bandwidth of a communication interface between the emulator and a host computer), in which case the emulator would need to be slowed down. Thus, there is a tradeoff between emulation speed and the amount of visibility achieved. As such, neither pure simulation nor pure emulation is suitable for many of today's circuit designs.

SUMMARY

A system in accordance with one embodiment of the present disclosure includes a hardware emulation system and one or more processors communicatively coupled to the hardware emulation system. The one or more processors are configured to divide a circuit design into partitions that are substantially uniform in size. The one more processors are further configured to identify sequential dependencies based on signals that cross partitions and to determine a set of primary signals that, when provided as input to a simulation of the circuit design, break the sequential dependencies such that each partition can be simulated independently. The set of primary signals includes a subset of the signals that cross partitions. The one or more processors configure the hardware emulation system to capture values of the set of primary signals during emulation of the circuit design. The one or more processors are further configured to perform the simulation using the captured values. The simulation involves reconstructing signals not included in the set of primary signals using values obtained from simulating each partition independently.

A method in accordance with one embodiment of the present disclosure involves dividing a circuit design into partitions that are substantially uniform in size. The method further involves identifying sequential dependencies based on signals that cross partitions, and determining a set of primary signals that, when provided as input to a simulation of the circuit design, break the sequential dependencies such that each partition can be simulated independently. The set of primary signals includes a subset of the signals that cross partitions. The method further involves configuring a hardware emulation system to capture values of the set of primary signals during emulation of the circuit design and performing the simulation using the captured values. The simulation involves reconstructing signals not included in the set of primary signals using values obtained from simulating each partition independently.

A system in accordance with one embodiment of the present disclosure includes memory and one or more processors. The memory stores electronic design automation (EDA) software, including a simulation program configured to perform a simulation of a circuit design. The one or more processors are communicatively coupled to a hardware emulation system and configured to execute program instructions of the EDA software. The program instructions cause the one or more processors to divide the circuit design into partitions that are substantially uniform in size. The program instructions further cause the one or more processors to identify sequential dependencies based on signals that cross partitions, and to determine a set of primary signals that, when provided as input to the simulation, break the sequential dependencies such that each partition can be simulated independently. The set of primary signals includes a subset of the signals that cross partitions. The program instructions further cause the one or more processors to configure the hardware emulation system to capture values of the set of primary signals during emulation of the circuit design and to perform the simulation using the captured values. The simulation involves reconstructing signals not included in the set of primary signals using values obtained from simulating each partition independently.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 6 illustrates an example of breaking sequential dependencies using fan-in and fan-out analysis.

FIG. 8 is a flowchart of a method for simulating a circuit design using primary signals captured during emulation, according to certain embodiments.

DETAILED DESCRIPTION

Figure 1:
FIG. 1 illustrates a computing environment according to certain embodiments.

Aspects of the present disclosure relate to simulation of circuit designs. In some embodiments, a circuit design is partitioned into pieces for sequential simulation. The partitions can be simulated independently of each other, e.g., with at least some of the partitions being simulated in parallel on one or more computer devices. The partitions can be sized based on the amount of memory available for simulation, e.g., to constrain the memory allocated to simulating an individual partition to an upper bound. In some embodiments, the partitions are substantially uniform in size so that each simulation job consumes approximately the same amount of memory and/or other simulation resources.

Sequential simulation is difficult to perform in a parallel manner because the existence of sequential dependencies generally prevents a circuit design from being broken into smaller, independent pieces for simulation in parallel. Instead, the entire DUT usually has to be simulated as a whole when performing sequential simulation, which makes sequential simulation impractical for large circuit designs. By contrast, combinational simulation is much easier to parallelize but requires more signals to be captured in advance during emulation. In particular, combinational simulation requires capturing of all non-combinational signals in the DUT (e.g., values of registers or other state-holding elements) in addition to capturing of primary inputs (described below). Typically, the non-combinational signals and the primary inputs are sampled on every clock cycle of the emulator, which consumes a lot of hardware resources and may necessitate slowing down the emulator (lower clock frequency) because of the sheer amount of data that needs to be captured and transferred out of the emulator. Sequential simulation requires significantly fewer signals to be captured. For example, the capture process for sequential simulation may involve sampling all primary inputs on every clock cycle but sampling of only a fraction of registers/state-holding elements at a less frequent interval (i.e., not every cycle). Thus, if sequential dependencies are able to be broken, then sequential simulation can be performed efficiently while imposing a significantly lower burden on the emulator compared to when the same DUT is simulated using combinational simulation.

Accordingly, aspects of the present disclosure relate to determining desired signals of a circuit design to capture during emulation (referred to herein as primary signals) in order to enable a simulation system to perform sequential simulation in a parallel manner. When the desired signals are designated as primary signals, the sequential dependencies can be broken so that the partitions can be simulated independently. The simulation system can reconstruct signals associated with the circuit design, including non-primary signals, after all the partitions have been simulated.

The following discussion of terminology is provided for additional context in the subsequent discussion of various embodiments, as described with reference to the accompanying drawings. Circuit designs can be represented in various ways, including hardware description language (HDL). In an electronic design automation system, circuit designs are often expressed in the form of a netlist, which can be viewed as a graph of vertices and edges connecting the vertices.

A vertex can represent an individual circuit element, e.g., a piece of digital logic. An edge can represent a signal communicated between circuit elements. In the context of a circuit design, edges can be directional. Thus, a directed graph G is a couple (V, E) of vertices V and edges E. The set of edges E is a subset of V×V. An undirected graph is a graph in which the edges are not directional, meaning for an edge {u, v}, it is possible to go from u to v and from v to u.

A subgraph is a graph G'=(V', E'), such that V' is included in V, and E' is included in (V'×V') and E.

A vertex v2 is a successor of a vertex v1 if and only if (v1, v2) is an edge. Another way of stating this relationship is to say that v2 is in the fan-out of v1 and, conversely, that v1 is in the fan-in of v2. The vertex v1 and the vertex v2 can be directly connected or connected through one or more intermediate vertices. Thus, v2 is reachable from v1 if and only if there is a sequence of one or more edges (v_i, v_{i+1}), 0<=i<=n, such that v_0=v1 and v_{n+1}=v2. This sequence of one or more edges is called a path from v1 to v2.

The transitive fan-in (TFI) of a vertex v is denoted TFI(v) and is the transitive closure of the fan-in relation. Similarly, the transitive fan-out (TFO) of a vertex v is denoted TFO(v) and is the transitive closure of the fan-out relation.

Two vertices v1 and v2 are considered weakly connected if it is possible to go from v1 to v2 using both the fan-out relation and the fan-in relation. In other words, both edge directions can be used to establish a path from v1 to v2. This is equivalent to considering the paths in the undirected graph induced by G. Being weakly connected is an equivalence relation (i.e., symmetric, reflexive, and transitive), and the induced subgraphs of its equivalence classes are called weakly connected components (WCCs).

As mentioned above, a circuit design can be expressed as a netlist. A netlist includes cells and nets. A cell may have input ports and output ports. A net is a set of one or more ports and represents a signal of the circuit. Without loss of generality, and for illustration purposes only, it can be assumed that cells and nets have only one output port. In fact, this can be achieved through simple transformations of the original circuit design without changing the behavior of the circuit. In this way, each net can be identified with the cell that owns its output port, and conversely, each cell can be identified with the net that owns its output port. Thus, cell and net are at times used interchangeably in the following description. Accordingly, the waveform of a signal in a circuit can be characterized by the value of a net over time, and the waveform can be uniquely associated with a particular cell in the netlist. Based on the above discussion, it is apparent that a netlist can be considered as being a directed graph G in which the vertices V correspond to a set of cells, each cell having a single output, and in which the set of edges E are made up of edges (v1, v2) such that there is a net which connects the output port of cell v1 to an input port of cell v2.

A primary signal (alternatively, primary) is any signal whose value is provided as an input to a simulation system. In the case where the waveform of a signal is uniquely associated with a particular cell in a netlist, a primary can correspond to the signal at the output port of that cell. As such, primaries can include cells whose values are given to a simulation system so that the values of those cells do not have to be computed during simulation. During emulation, an emulation system can capture changes in the values of primaries, e.g., through sampling the values of the primaries at each cycle. The simulation system can then use the value changes to simulate other cells (i.e., every non-primary cell).

Figure 11:
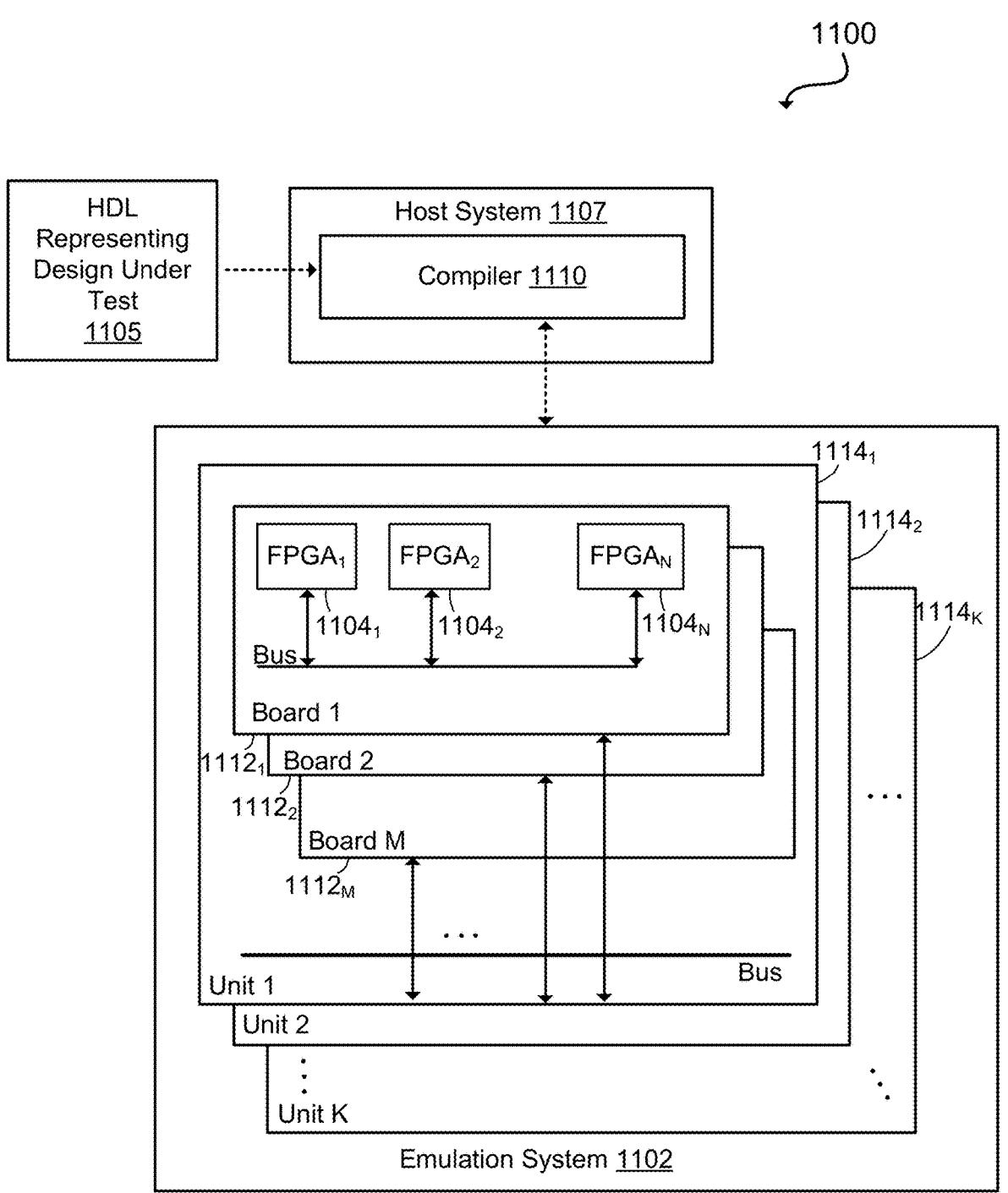
FIG. 11 depicts a diagram of an example emulation system in accordance with some embodiments of the present disclosure.

FIG. 1 shows an example computing environment 100 according to certain embodiments. The computing environment 100 includes a computer system 110 and an emulation system 120. The emulation system 120 is a hardware emulation system and can be based on any of a variety of existing emulation architectures. An example of an emulation system formed using field programmable gate arrays (FPGAs) is shown in FIG. 11, discussed below. However, the techniques described herein are not restricted to use with any particular emulation architecture. As shown in FIG. 1, the emulation system 120 can be part of the computer system 110 or a separate system coupled to the computer system 110 via one or more communication networks 140.

Computer system 110 includes a storage subsystem 112 and one or more processors 114. The processor(s) 114 are communicatively coupled to the storage subsystem 112 and other components of the computer system 110 via a communication fabric 104. The communication fabric 104 can include, for example, a bus that permits communication between the processor(s) 114 and a number of peripheral devices. A processor 114 can be a microprocessor, a graphics processing unit, a digital signal processor, or any of their electronic processing equivalents, such as an application-specific integrated circuit (ASIC) or FPGA. A processor 114 can be formed using any number of processing units and, as such, can be a single processor, a multi-core processor, a multi-processor array, etc.

Storage subsystem 112 may include a memory 122 and a file storage 124. The memory 122 typically includes a number of memory devices usable for storing information, such as instructions and data during program execution by the processor(s) 114. The memory 122 can include volatile storage such as random-access memory (RAM), non-volatile storage such as read only memory (ROM) or flash memory, or a combination of volatile and non-volatile storage.

In the example of FIG. 1, the memory 122 stores electronic design automation (EDA) software 155. The EDA software 155 can include one or more software programs that are used to model, design, and/or test circuits. For example, the EDA software 155 can include a program executable by the processor(s) 114 to provide a simulation system for simulating a circuit design.

In some instances, EDA software 155 may control the operation of the emulation system 120. For example, the EDA software 155 can include a compiler program that prepares instructions for the emulation system 120 based on one or more circuit designs 159 stored in memory 122. The compiler may be configured to convert an electronic design file in HDL format into a netlist representing a circuit design. The compiler may also assign circuit elements to hardware resources of the emulation system 120, e.g., by mapping cells in the netlist to an emulation space formed by FPGAs or other emulation resources. Additionally, the EDA software 155 may be responsible for indicating which signals of the circuit design are to be captured by the emulation system 120. The signals captured by the emulation system 120 can include one or more signals used as input for simulating the circuit design. As discussed below in reference to FIG. 2, this functionality of the EDA software may be implemented through the compiler. Thus, the compiler can act as a software interface for communications between the emulation system 120 and the simulation system.

File storage 124 can include one or more storage devices configured to provide persistent storage for program and data files. Examples of file storage devices include a hard disk drive, a solid-state device (SSD) drive, a CD-ROM drive, etc. The file storage 124 can be used for long-term storage of information used or generated by the computer system 110 in connection with emulation and/or simulation. For example, file storage 124 may store additional circuit designs that can be loaded into the memory 122, models of individual circuit elements (e.g., a cell library), output generated by the emulation system 120 (e.g., files containing captured signal values), and/or output generated during simulation (e.g., files containing values of reconstructed signals). Thus, the file storage 124 can store databases and/or modules that implement the functionality of certain embodiments.

Peripheral devices can include input device(s) 116 and output device(s) 118. An input device 116 can be any device capable of receiving input from a user of the computer system. Examples of input devices include a keyboard, a mouse, a trackball, a stylus, a touchscreen, a microphone, etc. Input devices may encompass any number of devices that permit the user to input information into the computer system 110 or onto the communication network(s) 140. In some embodiments, the input device(s) 116 are used to provide configuration parameters for the emulation system 120 and/or the simulation system. For example, the user may use an input device to specify a value for the maximum allowable amount of memory used during simulation. This value may correspond to an upper limit on the total memory (e.g., in megabytes of RAM) consumed during simulation or an upper limit on the memory consumed by any particular simulation job (e.g., when multiple simulation jobs are executed in parallel). As another example, an input device may be used to specify a desired operating speed (e.g., clock frequency) and/or capture rate (e.g., sampling frequency) used during emulation of a circuit design.

An output device 118 can be any device capable of presenting output through a user interface. Examples of output devices include an audio speaker, a display monitor (e.g., a liquid crystal or light-emitting diode display), a haptic feedback (e.g., vibration) device, etc. Thus, output devices can provide visual output or non-visual output and may encompass any number of devices that permit information to be output from the computer system 110 to the user.

The computer system 110 may be a server computer, a client computer, a workstation, a mainframe, a personal computer (PC), a tablet computer, or any data processing machine capable of executing instructions (sequential or otherwise) that specify actions to be taken by that machine. Although only a single computer system 110 is shown in FIG. 1, the computing environment 100 can include multiple computer systems. In some instances, a circuit design may be partitioned for simulation concurrently (e.g., in parallel) on different computers. Each computer may be assigned one or more partitions to simulate independently of other partitions. After all the partitions have been simulated, the results of the individual simulations can be combined to complete the overall simulation of the circuit design. The overall simulation may involve reconstructing signals in the circuit design (e.g., computing the values at each cell in a netlist over a period of time) and can likewise be performed by a single computer or multiple computers. When the signals are reconstructed, the values of signals that have already been captured by the emulation system 120 need not be computed.

The computer system 110 can include a network interface subsystem 130. The network interface subsystem 130 may be coupled via the communication network(s) 140 to corresponding interface devices in other computer systems or machines. Traffic over the communication network(s) 140 can be conveyed through wired links, wireless links, and/or other types of communication links (e.g., optical). Thus, the communication networks(s) 140 can be wired and/or wireless, and may encompass any suitable computer network, for example a wide area network such as the Internet and/or a local area network such as Ethernet.

Figure 2:
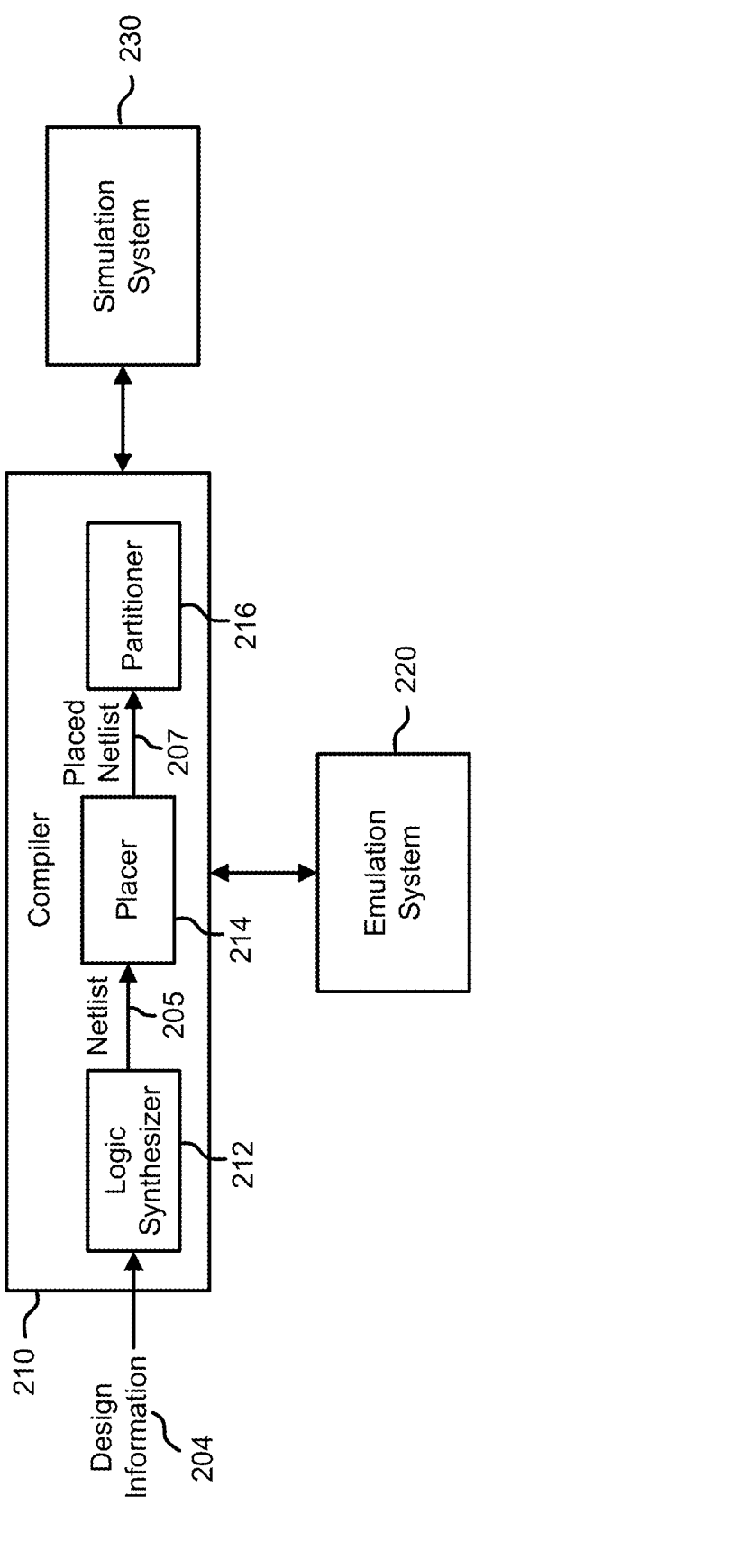
FIG. 2 is a block diagram illustrating components configured to perform hardware emulation and simulation, according to certain embodiments.

FIG. 2 is a block diagram of a system 200 including components configured to perform hardware emulation and simulation, according to certain embodiments. The system 200 includes a compiler 210, an emulation system 220, and a simulation system 230. The system 200 may implement the computing environment 100 in FIG. 1. For example, the compiler 210 can be part of the EDA software 155, the simulation system 230 can also be provided by the EDA software 155, and the emulation system 220 can correspond to the emulation system 120.

Compiler 210 can include a synthesizer module 212, a placer module 214, and a partitioner module 216. In some implementations, the functionality of the partitioner module 216 may be integrated into the placer module 214. The compiler 210 can be executed on a host computer system (e.g., the computer system 110). In addition to the compiler 210 and the simulation system 230, the system 200 may include a run-time module, a debugger, and/or other software components that provide EDA functionality. The various subsystems and modules within the system 200 can be implemented on a single computer system (e.g., the host computer system) or on any number of computer systems.

As shown in FIG. 2, the compiler 210 receives design information 204 for a circuit design that is to be simulated (e.g., a DUT). The design information 204 can include a description of the circuit design, typically written in a description language such as HDL or register transfer language (RTL). In some instances, the design information 204 includes a netlist 205, e.g., netlist level files or a mix of netlist level files and HDL files. If the design information 204 does not already include a netlist, the synthesizer module 212 of the compiler can synthesize the design information 204 to create the netlist 205 from the description contained therein. For example, the synthesizer module 212 may transform an HDL description into corresponding gate level logic so that the netlist 205 is generated as a gate level netlist with a description of the DUT in terms of gate level logic.

Placer module 214 is configured to assign the circuit elements described in the netlist 205 to emulation resources (e.g., FPGAs) in the emulation system 220, thereby mapping the circuit elements to an emulation space of the emulation system 220. The placement results in a placed netlist 207 and is typically done at the logic gate-level. The emulation space can be a multi-dimensional (e.g., two-dimensional (2D) or three-dimensional (3D)) space representing the hardware resources of the emulation system. The placer module 214 generally attempts to distribute the circuit elements evenly across the hardware resources of the emulation system 220. As such, the placer module 214 may divide the emulation space into equal-sized tiles (e.g., square or rectangular tiles that form a rectilinear grid in the case of a 2D emulation space) and place the circuit elements onto the tiles such that the density of circuit elements is similar across tiles. When determining a location to place the circuit elements, the placer 214 may also attempt to minimize the number of nets that cross tiles (minimizing cut, as discussed below in reference to FIG. 4). In this manner, the placer module 214 can determine the physical layout of the circuit design within the emulation space of the emulation system 220. The placed netlist 207 indicates how the circuit design in the netlist 205 is mapped within the emulation space. For example, the placed netlist 207 may include information identifying the physical locations and/or emulation resources associated with the cells of the netlist 205. After the circuit elements have been placed, the compiler may connect the circuit elements by routing the nets. Routing can be performed by a separate router module (not shown) as part of the overall design process.

Partitioner module 216 is responsible for dividing the circuit design into pieces for simulation. In particular, the partitioner module 216 can break the placed netlist 207 into smaller pieces that can be simulated independently so that less memory is used compared to simulating the entire circuit design as one piece. Each piece/partition may be assigned to a separate simulation job that can be performed in parallel with other simulation jobs on different processors or computers. The partitioner module 216 can use the placement of the circuit design within the emulation space as a starting point for generating the partitions. That is, the partitions can be formed by distributing the simulation jobs across the grid of the emulation space, with each simulation job corresponding to a subgraph of the placed netlist 207. The partitioner module 216 can determine the number of partitions by taking the memory consumption of each partition into consideration. For example, the partitioner module 216 may limit the size of each partition based on a maximum allowed amount of memory for any given simulation job. As such, each partition may encompass one or more tiles. Further, to balance the memory consumption of the simulation jobs, the partitioner module 216 can make the partitions substantially uniform in size, e.g., so that every partition has the same number of tiles.

In addition to placement and partitioning, the compiler 210 or another component of the host computer system may determine which signals to capture during emulation, e.g., which signals to designate as primary signals. Signal capture can be performed using hardware resources of the emulation system 220. Depending on implementation, the capture resources can include dedicated trace logic (e.g., preconfigured sampling circuits) and/or be allocated from the same pool of hardware resources used to emulate the circuit design. For example, the synthesizer module 212 may insert trace logic into the design before or after synthesizing the design information 204. As such, the inserted trace logic can also be mapped to the emulation resources by the placer module 214.

Emulation system 220 includes hardware resources that are configured or configurable to reproduce the behavior of a circuit design, e.g., using the placed netlist 207 and in connection with functional verification. The emulation system 220 can be implemented using FPGAs, ASICs, and/or other types of emulation resources. The emulation resources are typically programmable, but fixed-configuration devices can also be used as emulation resources. For example, emulation system 220 can include a replica of one or more circuit elements to supplement functionality provided by FPGAs. The emulation results produced by the emulation system 220 can include captured values of signals for use during the simulation subsequently performed by the simulation system 230. The emulation results can be transmitted, for example, through a communication interface to the host computer on which the compiler 210 is executed. Thus, the compiler 210 may serve as an intermediary between the emulation system 220 and the simulation system 230 in some embodiments.

Figure 3:
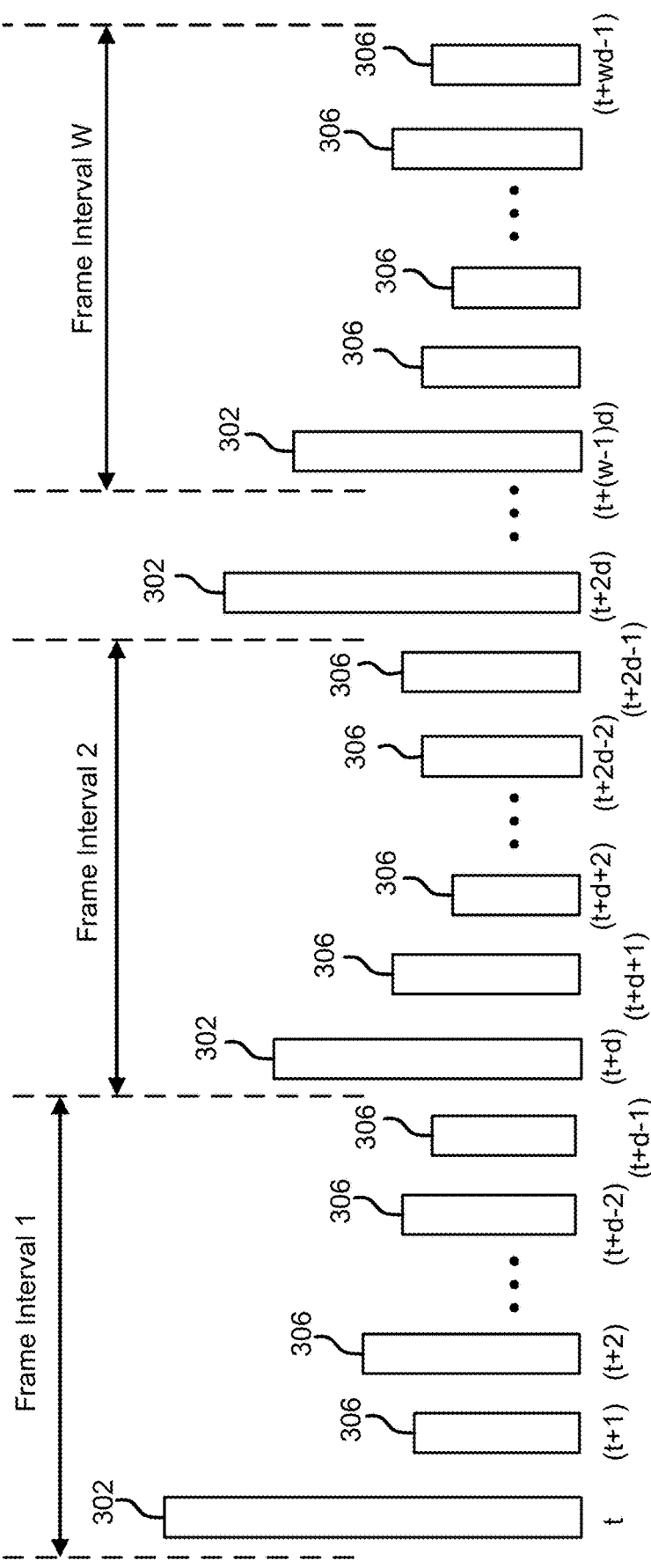
FIG. 3 shows an example of data captured during emulation.

The host computer system can receive the emulation results through a separate run-time module. The emulation results describe the values of the captured signals over time and may be organized in frames, with each frame covering one or more clock cycles of the emulation system 220. FIG. 3 (described below) shows an example of a sequence of frames that can be used to reconstruct signals during simulation. However, other methods of obtaining emulation results for reconstructing signals during simulation may be used in conjunction with the techniques disclosed herein. The host computer system can communicate the emulation results to the simulation system 230 immediately upon receiving the emulation results from the emulation system 220. Alternatively, the emulation results can be stored in a memory of the host computer system (e.g., saved as a file) for later use by the simulation system. The emulation results can also be transmitted to another computer system (e.g., when the simulation system 230 resides on a separate computer).

Simulation system 230 uses the emulation results from the emulation system 220 as input for simulating the circuit design. Using hardware emulation together with software simulation has certain advantages compared to emulation only or simulation only. From an information standpoint, pure simulation is beneficial because the value of any signal of the circuit design is accessible at any moment. This is because every signal's waveform can be reconstructed using a model of the circuit design. If the entire circuit design is simulated, then the simulation system has full visibility into the design. However, pure simulation can be computationally intensive. If a DUT is too large, simulating the entire design may take too long or require too much memory. In some cases, the memory requirements for a simulation job may exceed the amount of memory available, so the simulation job cannot even start.

Emulation is significantly faster than simulation, typically on the order of ten thousand or a hundred thousand times faster. However, signal visibility in emulation relies on the use of hardware resources (e.g., resources that implement trace logic) to capture signals. An emulation system may not have enough of such resources to capture every signal of interest (e.g., every net or cell within a netlist). Further, even if the emulation system has enough resources, the emulation system may need to be slowed down to allow time for the signals to become ready for capture, or to transmit the value changes to a host computer. Thus, there is a tradeoff between how fast an emulation system can run and how much visibility the emulation system can achieve.

One way to achieve full visibility without pure simulation or pure emulation is to use an emulation system to capture a subset of signals that are sufficient to enable a simulation system to subsequently reconstruct the waveforms of all signals. For example, in combinational simulation, the circuit design is partitioned into combinational logic elements, and the value of any signal associated with a combinational element can readily be computed as a function of the instantaneous value of every signal on which that particular signal depends. Only combinational signals, i.e., signals associated with combinational elements, are reconstructed. However, this generally requires a lot of information to be extracted from the emulation system. For example, in order for the simulation system to be able to reconstruct every signal associated with a combinational element, the emulation system may need to provide a complete set of values for every non-combinational signal, i.e., any signal associated with a sequential or state-holding element.

Further, the values of the non-combinational signals may need to be sampled continuously throughout the entire emulation period, e.g., through capturing the values of flip-flops, latches, or other state-holding elements at every clock cycle. This can potentially slow the emulation system, for example, due to bandwidth limitations on the rate at which emulation results can be extracted.

Despite the potential for negatively influencing the performance of the emulation system, combinational simulation has certain advantages. One advantage it that is relatively easy to break down a netlist into smaller, balanced partitions so that each partition can be independently simulated using combinational simulation. As such, combinational simulation tends to be memory efficient and fast in terms of time to completion.

Sequential simulation is another method for simulating a circuit design. Sequential simulation uses less extracted signal information than combinational simulation but is also significantly slower. This is because signals are reconstructed on a per simulation cycle basis instead of all at once: the values of sequential/state-holding elements (also referred to as state elements) in one simulation cycle are propagated through non-state elements (e.g., combinational logic) to compute values of sequential elements in the next simulation cycle. Additionally, because of sequential dependencies between inputs of sequential elements and their outputs, it is practically impossible to break down the netlist into smaller partitions that can be simulated independently using sequential simulation. Instead, the sequential simulation may need to be performed on the circuit design as a whole, which incurs a higher memory cost because the entire netlist is maintained in memory throughout the sequential simulation. The overall time to complete the simulation is also longer.

To enable the simulation system 230 to perform sequential simulation in a memory-efficient manner, the emulation system 220 can be configured (e.g., programmed by the compiler 210 or the run-time module) to extract a limited set of primary signals. The set of primary signals includes signals that, when provided as input to the sequential simulation, break the sequential dependencies. In this way, the sequential simulation can be divided into simulation tasks that can be performed independently, e.g., in parallel, which reduces overall waveform reconstruction time. Additionally, the circuit design can be partitioned in such a way that each simulation job consumes approximately the same amount of memory and is restricted to some maximum allowable memory amount. Thus, the simulation jobs can be balanced, and an upper bound on the memory footprint of each simulation job can be guaranteed while, at the same time, imposing less burden on the emulation system 220.

FIG. 3 shows an example of a sequence of frames captured by an emulation system. The example shown in FIG. 3 is provided merely to illustrate that values captured during emulation of a circuit design can be formatted for use in signal reconstruction during a subsequent simulation of the same circuit design. However, other methods of obtaining emulation results can be used in conjunction with the simulation-related techniques disclosed herein.

In FIG. 3, the emulation system has captured a sequence of frames, which span w number of frame intervals. Each frame interval can cover one or more sampling cycles, and each sampling cycle is associated with a corresponding frame. For example, FIG. 3 shows that each frame interval may include d number of sampling cycles for a total of w*d sampling cycles/frames. In some instances, a sampling cycle corresponds to a clock cycle of the emulation system, i.e., a single clock tick, but the sampling cycle and the clock cycle of the emulator need not be the same.

FIG. 3 also shows that the amount of data captured can vary from one sampling cycle to another. This is represented in FIG. 3 by differences in the heights of the frames. Multiple types of frames may be supported depending on how the emulation system is implemented. For example, an initial frame 302 in each frame interval may include values for every signal in a set of signals to be captured, but subsequent frames 306 may only include changes in the values of the set of signals. Thus, each frame 306 can include updated values for any primary signal that changed between the instant frame and the immediately preceding frame. If the emulation system is being used to capture values for combinational simulation, then the primary signals will include signals associated with sequential elements. Similarly, if the values are being captured for use with sequential simulation, then the primary signals will include combinational signals. As explained above, combinational simulation requires significantly more information to be extracted from the emulation system. Using the frame sequence in FIG. 3 as an example, combinational simulation may require the values of all non-combinational signals (i.e., values of sequential elements) to be captured at each initial frame 302 and may also require that any change in the value of a non-combinational signal be captured at every successive frame 306 in any given frame interval. That is, all non-combinational signals may be sampled at every sampling cycle, and any changes in the values of the non-combinational signals may be recorded in a corresponding frame. As such, it can be expected that the frames will, in general, carry a significantly greater amount of data when used to support combinational simulation as opposed to sequential simulation.

A simulation system can internally represent a circuit as a graph, where the vertices of the graph correspond to cells of the circuit's netlist. To compute the value of a cell/vertex v, the simulation system can first compute the values of v's fan-in, then combine these values to compute v's output.

Such computation is possible whenever the cell v has a known behavior that can be modeled.

Some cells are combinational (e.g., an AND gate, an OR gate, or other non-state-holding element). The output of a combinational cell only depends on the values of the input(s) to the combinational cell. Other cells are sequential (e.g., a flip-flop, latch, or other state element). The output of a sequential cell depends on the values of its inputs plus the current state of the sequential cell.

Primaries can include signals associated with combinational cells, sequential cells, or both combinational and sequential cells. Some signals are made primary for convenience. For example, the outputs of a large memory can be designated primaries to save simulation computing resources. Some signals must be made primary because they cannot be computed during simulation. To distinguish mandatory primary signals from signals that can optionally be designated as primary, mandatory primary signals can be referred to as primary inputs. For example, an input signal coming from outside a DUT may be subject to change by some external agent and, as such, must be made primary because the input signal cannot be computed. Which signals are considered primary inputs will depend on whether sequential simulation or combinational simulation is to be performed. In the case of combinational simulation, all non-combinational signals (i.e., any signal associated with a sequential/state element) must be made primary because combinational simulation is incapable of reconstructing sequential signals. Further, as discussed above, the sequential signals would be sampled (together with all other primary signals) on every sampling cycle in the case of combinational simulation.

When viewed in the context of simulating a netlist, a cell that is primary can be disconnected from its input by removing any edges leading to its input. This is because the value of a primary cell is given to the simulator, and since the simulator does not need to simulate that cell, disconnecting it from its inputs will not change the result of the simulation. The graph that results from disconnecting the inputs to each primary in a set of primaries P is denoted herein as G\P and reflects the dependencies between cells that must be simulated, in the sense that there is an edge (v1, v2) only if the value of cell v2 depends on the value of cell v1. Any two distinct weakly connected components of G\P can be simulated independently from each other because there is no edge between these WCCs, and therefore no value dependency.

For combinational simulation the set of primaries P must include all the sequential elements. Consequently, the graph G\P for a combinational simulation is usually broken down into many WCCs, because in practice the density of state elements in circuits is relatively high (typically around 15-40%). Each of these WCCs can be simulated independently from each other and is significantly smaller than the original graph G. Thus, the memory requirement for combinational simulation is lower compared to sequential simulation. However, as noted above, making all state elements primaries can drastically slow down the emulator (e.g., on the order of a hundred or a thousand times slower) because there are numerous signals to capture.

In the case of sequential simulation, if the set of primaries P is made up of only primary inputs (i.e., combinational signals and other mandatory primaries), then the emulator can run at full speed, and sequential simulation can be used to provide full visibility. Thus, sequential simulation can be performed through sampling all primary inputs on every sampling cycle while sampling only a portion of the sequential elements at a less frequent interval (e.g., every d sampling cycles in FIG. 3, where d is some integer greater than 1). It is unnecessary to make every sequential element primary in order to achieve efficient sequential simulation since it is often possible to compute the value of a sequential element in the next sampling cycle based on the current value of the sequential element (e.g., the initial state of a flip-flop) and propagating that current value through some combinational logic that loops back to the input of the sequential element. However, the graph G\P for a sequential simulation is usually a single WCC, which must be simulated whole. The memory requirement for simulating the entire graph G\P becomes a bottleneck. To enable sequential simulation to be performed on different portions of G\P independently, a small number of primaries can be added to the set of primaries P in addition to the primary inputs. When the edges associated with these additional primaries are removed as a result of disconnecting the inputs to the additional primaries, some WCCs will break apart into smaller WCCs that can then be simulated independently. Further, the size of the set of primaries P is expected to be much smaller compared to the set P that would be used for combinational simulation even with the inclusion of these additional primaries.

Accordingly, certain aspects of the present disclosure relate to determining which signals to make primary in order to permit partitions corresponding to sub-circuits to be simulated independently using sequential simulation, so that each sub-circuit's waveforms can be reconstructed independently of other sub-circuits. Aspects of the present disclosure also relate to dividing a circuit design into balanced, predictable size partitions so that when such partitions are simulated using separate simulation jobs, the memory requirements for each simulation job are approximately the same. The problem to be solved in order to meet these objectives can be stated as: add a minimum number of extra primaries to P so that G\P breaks into n number of disconnected graphs of about the same size (e.g., size |G|/n). Further, if a user wants to specify an upper bound M on the memory consumed by an individual simulation job, the user can choose n to be an integer value such that $n \approx |G|/M$. In practice, the number of extra primaries tends to small (usually less than one percent of the total number of state elements), so the impact on the speed of the emulation system is negligible.

Figure 4:
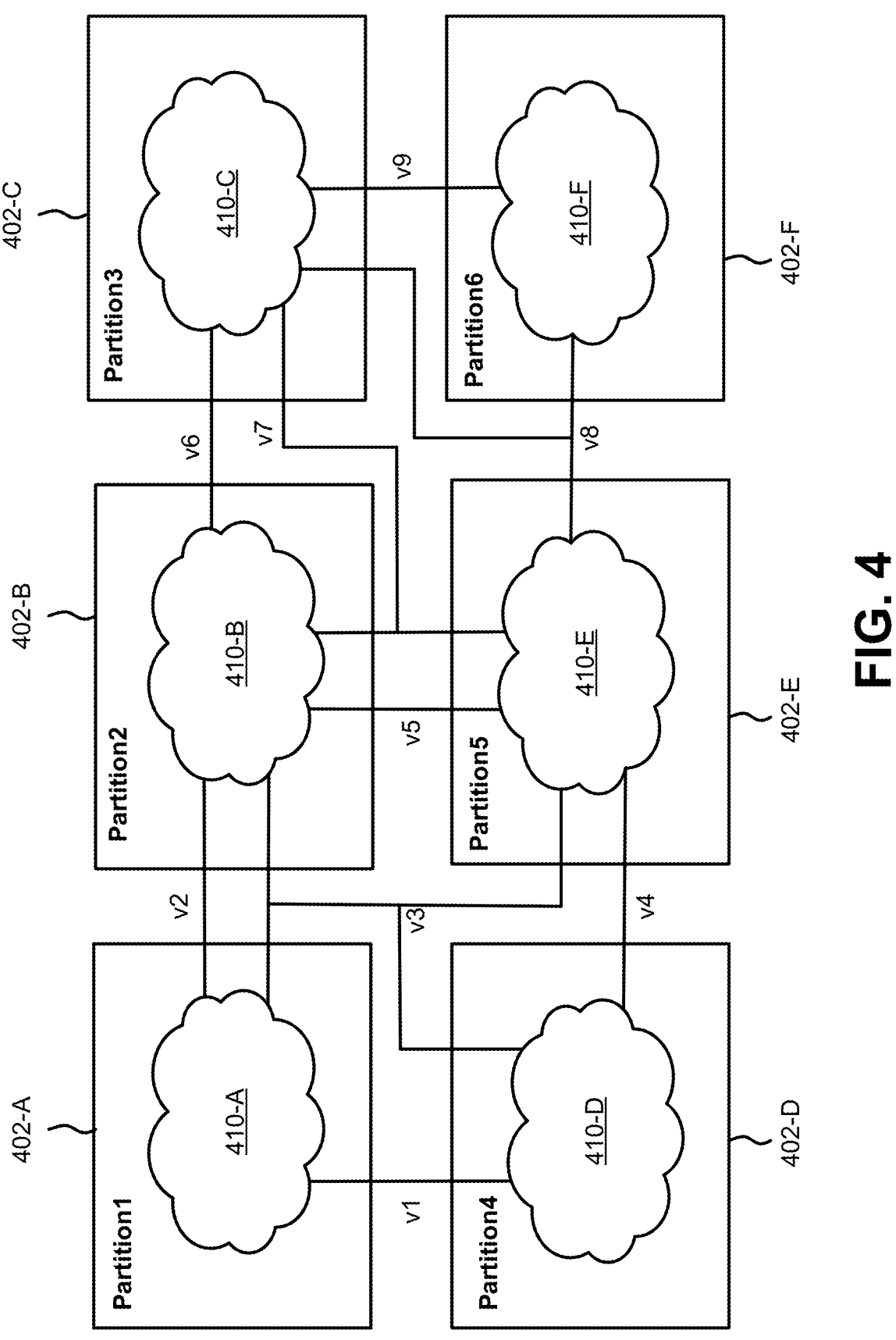
FIG. 4 illustrates an example partitioning of a circuit design.

FIG. 4 illustrates an example partitioning of a circuit design. In FIG. 4, the circuit design is divided into six partitions 402-A to 402-F with nine nets v1 to v9 that cross partitions. For example, net v1 connects partitions 402-A and 402D, net v2 connects partitions 402-A and 402-B, and net v3 has ports in partitions 402-A, 402-B, 402-D, and 402-E. Each partition 402 includes corresponding logic 410, e.g., partition 402-A has logic 410-A, partition 402-B has logic 410-B, and so on. The logic 410 in each partition can include combinational logic, sequential logic, or both combinational and sequential logic. Accordingly, the cell whose output port is associated with each of these nets can be a state element (e.g., a flip-flop) or a non-state element (e.g., a logic gate).

One method of forming the partitions 402-A to 402-F is to use an n-way graph partitioner to partition the graph G of the circuit design into n balanced subgraphs (in this example, n=6) while minimizing the number of edges crossing between subgraphs. However, this can be computationally expensive. Another way to form the partitions is to use the physical placement of the circuit design into the emulator hardware as a starting point.

When a compiler places cells into the emulation space of the emulator (possibly using a n-way graph partitioner), the compiler generally attempts to minimize the total hardware resources taken (e.g., area occupied) by the cells, while also minimizing cut. A cut is the number of nets crossing some boundary of a mesh. The boundary may be formed by physical features of the emulator (e.g., FPGA input/output pads, cable connections, backplane, etc.). Alternatively, the boundary may be part of a virtual mesh laid over the emulator's hardware in order to measure cut. Minimizing cut helps to make the emulator faster and avoids data congestion that would arise due to having a high density of nets. When too many nets are forced to travel within a small area, routing the nets becomes difficult or even impossible.

The mesh used by the compiler can be 2D, 3D or, in general, multi-dimensional. The mesh forms a tiling of the emulation space, as discussed above in reference to the operation of the placer module 214 in FIG. 2. Here, the term "tile" is used in a broad sense to refer to any enclosed area. In 2D, boundaries are lines and tiles are polygons (e.g., squares or rectangles). In 3D, boundaries are planes and tiles are polyhedrons. Each tile can, but need not, have the same shape and size. Assuming the tiles are uniform, and given enough tiles, the emulation space can be segmented into n subspaces of the shape and size. This forms a partition of the overall set of cells V into individual sets V_k, n sets in total (i.e., V_1, V_2, . . . , V_n). The sets V_k are balanced because in practice the density of cells in space is nearly uniform. Accordingly, in FIG. 4, each partition 402 can correspond to one or more tiles used to map the circuit design to the hardware resources of the emulation system. For example, the partition 402-A can be a single tile, two tiles, or a group of three or more tiles.

Once the sets V_K have been formed, all the nets that connect cells between different V_K can be designated primary to form n disconnected, balanced subgraphs that can be independently simulated. The set of nets that connect cells between different V_K is denoted R, and the resulting graph having disconnected subgraphs is G\R. Assuming the compiler is successful in minimizing the number of nets that cross tile boundaries, the total number of nets in R (nine in the example of FIG. 4) will be small compared to the total number of nets in the overall circuit. Therefore, it can be expected that the size of the set of primaries P will not increase significantly after the addition of R to the set P.

Based on the preceding discussion, it can be seen that if all nine nets in FIG. 4 (v1 to v9) are made primary, then the partitions 402-A to 402-F will become disconnected from each other, and the sub-circuit represented by each partition 402 can be simulated independently. However, making v1 to v9 primary comes at the cost of extra hardware resources used to capture changes in the values of v1 to v9 during emulation. As noted above, the size of R is small, so the extra cost may be insignificant. A more difficult challenge is the ability of the emulation system to successfully capture the value changes. If a net's value cannot settle before being captured, then the speed at which the emulation system runs must be reduced to allow sufficient time for settling.

Figure 5:
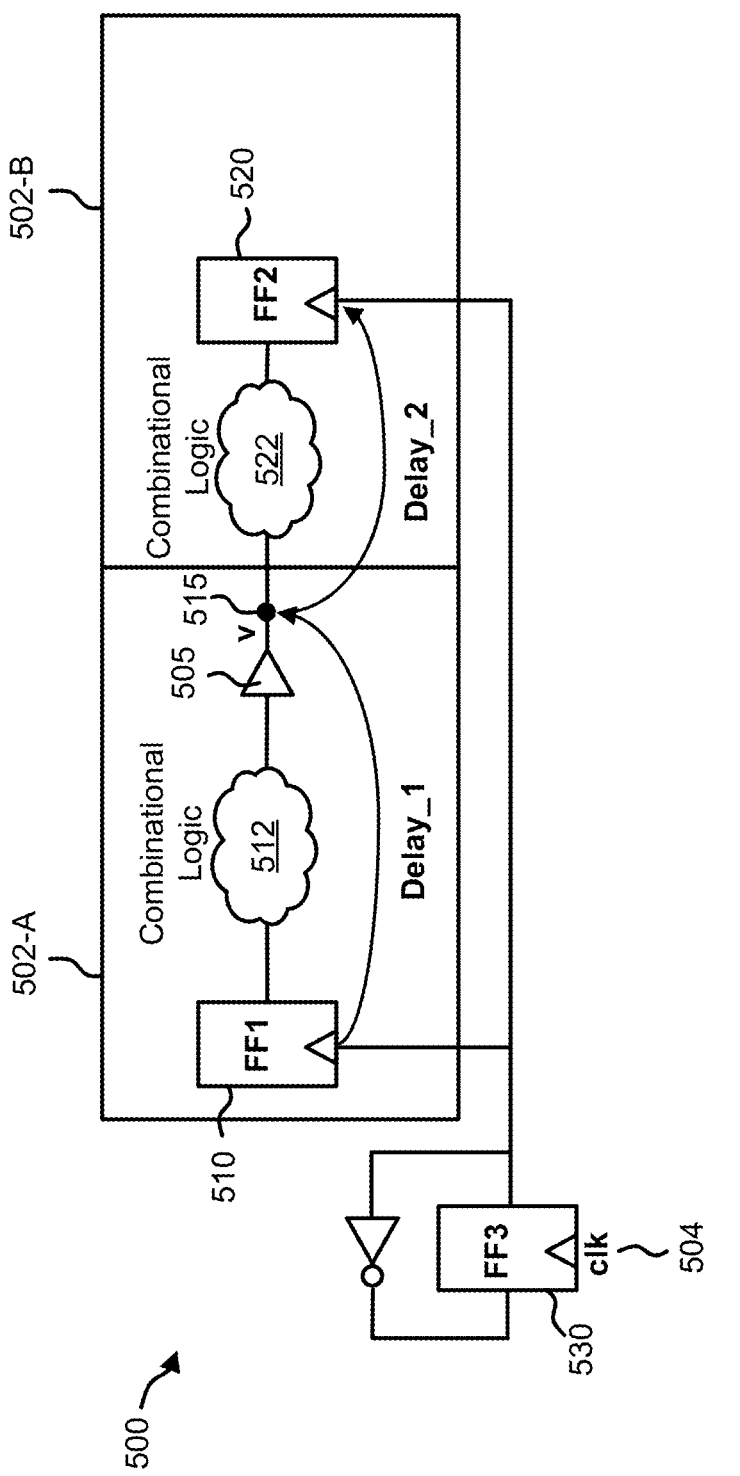
FIG. 5 shows an example of timing constraints on the sampling of a signal during emulation.

FIG. 5 shows an example of timing constraints on the sampling of a signal during emulation. In FIG. 5, a circuit 500 is divided into two partitions 502-A and 502-B. The partition 502-A includes a first flip-flop 510 (FF1), a cell 505, and some combinational logic 512 connecting the flip-flop 510 to the cell 505. In this example, the cell 505 is a non-state element (depicted as a buffer). The partition 502-B includes a second flip-flop 520 (FF2) and some combinational logic 522. A net 515 (labeled v) associated with the output port of the cell 505 crosses the boundary between the partitions 502-A and 502-B.

Additionally, both flip-flops 510 and 520 are driven by a clock signal produced by a third flip-flop 530 which runs off a clock signal (clk) 504.

Making the cell 505 primary can be challenging because the path from the first flip-flop 510 to the second flip-flop 520 is a multi-cycle path, meaning it takes multiple cycles of the clock signal 504 for a signal to propagate from the input of FF1 to the output of FF2. In this example, the timing constraint between FF1 and FF2 is equal to twice the clock period of the clock signal 504, i.e., delay_1+delay_2<2/f, where delay_1 is the delay between FF1 and output of the cell 505, delay_2 is the delay between the cell 505 and FF2, and f is the frequency of the clock signal 504. If the value of the net 515 is sampled based on the frequency f, this would require that delay_1 be less than or equal to 1/f, which may not always hold. The emulation system could instead be configured to sample the value of net 515 using a frequency less than or equal to 1/delay_1, but this assumes that the timing behavior of the circuit can be evaluated at the time of primary insertion to confirm that the value of the net 515 has settled by the time it is to be sampled, which may not be the case. Further, sampling on a frequency different from the base clock 504 may require more hardware resources from the emulation system, or worse, may require the emulation system to be slowed down by reducing the frequency f. Therefore, it will not always be the case that a signal which crosses partitions can be made primary. In other words, it is usually not possible to break the sequential dependencies between partitions simply by making every net in the set R primary.

Accordingly, breaking the sequential dependencies may involve determining which nets in the set R can be safely made primary from a timing standpoint and, for any nets in R that cannot be made primary, identifying one or more alternative primary signals (nets not included in R) that will break the sequential dependencies. These alternative primaries can be identified by evaluating the TFI and TFO of the nets that cannot be made primary, as shown in FIG. 6.

FIG. 6 shows an example of evaluating signals in the TFI and TFO of a net that crosses partitions in order to break sequential dependencies. There are situations where it is unnecessary to evaluate the TFI and TFO because the net in question can safely be made primary. One example is when the net corresponds to the output port of a state element (e.g., a flip-flop). Making the output of a state element primary does not impose any additional timing constraints because the value at the output, which represents the current state of the state element, is guaranteed to have settled. Accordingly, in some embodiments, the TFI and TFO are evaluated only if a target net is not associated with the output of a state element. If so, then a determination can be made as to whether the net can be sampled without slowing down the operating frequency of the circuit during emulation and without incurring the risk that the value of the net has not settled by the time of sampling. However, this determination depends on the availability of a timing analysis tool and a thorough understanding of the timing behavior of the circuit. Therefore, TFI and TFO evaluation can be performed in situations where there is either no such timing analysis tool or the results of the timing analysis indicate that the net cannot be made primary because the net is on a multi-cycle path.

In FIG. 6, a circuit 600 is divided into six partitions 602 (e.g., a partition 602-A and a partition 602-B) for simulation purposes. As discussed above in connection to FIG. 4, such partitions can be formed from the mesh created when the circuit is placed into the emulation space of an emulation system. The partitions 602 are depicted as being adjacent to represent that the emulation space may be physically contiguous. Further, the partitions 602 are depicted as forming a rectilinear grid to represent that the tiles of the mesh may also be rectilinear (e.g., 2D squares or 3D boxes) and uniformly sized.

A net 615 crosses the boundary between partition 602-A and partition 602-B. If the net 615 cannot be made primary, then one option for breaking the sequential dependency associated with the net 615 is to make a cut 612 along a TFI 610 of the net 615 and designate every signal 606 along the cut 612 primary. Similarly, a second option is to make a cut 614 along a TFO 620 of the net 615 and designate every signal 608 along the cut 614 primary. However, the cuts 612 and 614 cannot be made arbitrarily because the signals 606 and the signals 608 may be subject to timing constraints similar to the net 615 itself.

One solution to this problem is to trace the paths within the TFI and TFO to reach a termination point corresponding to the first state element encountered along each path. Then all such state elements can be made primary since, as explained above, doing so does not impose any extra timing constraint. The choice then becomes whether to make the state elements in the TFI 610 primary or to make the state elements in the TFO 620 primary. Either choice is sufficient to break the sequential dependency between partition 602-A and partition 602-B with respect to the net 615. In order to minimize the total number of primaries, whichever of the TFI or the TFO has fewer state elements can be selected.

Figure 9:
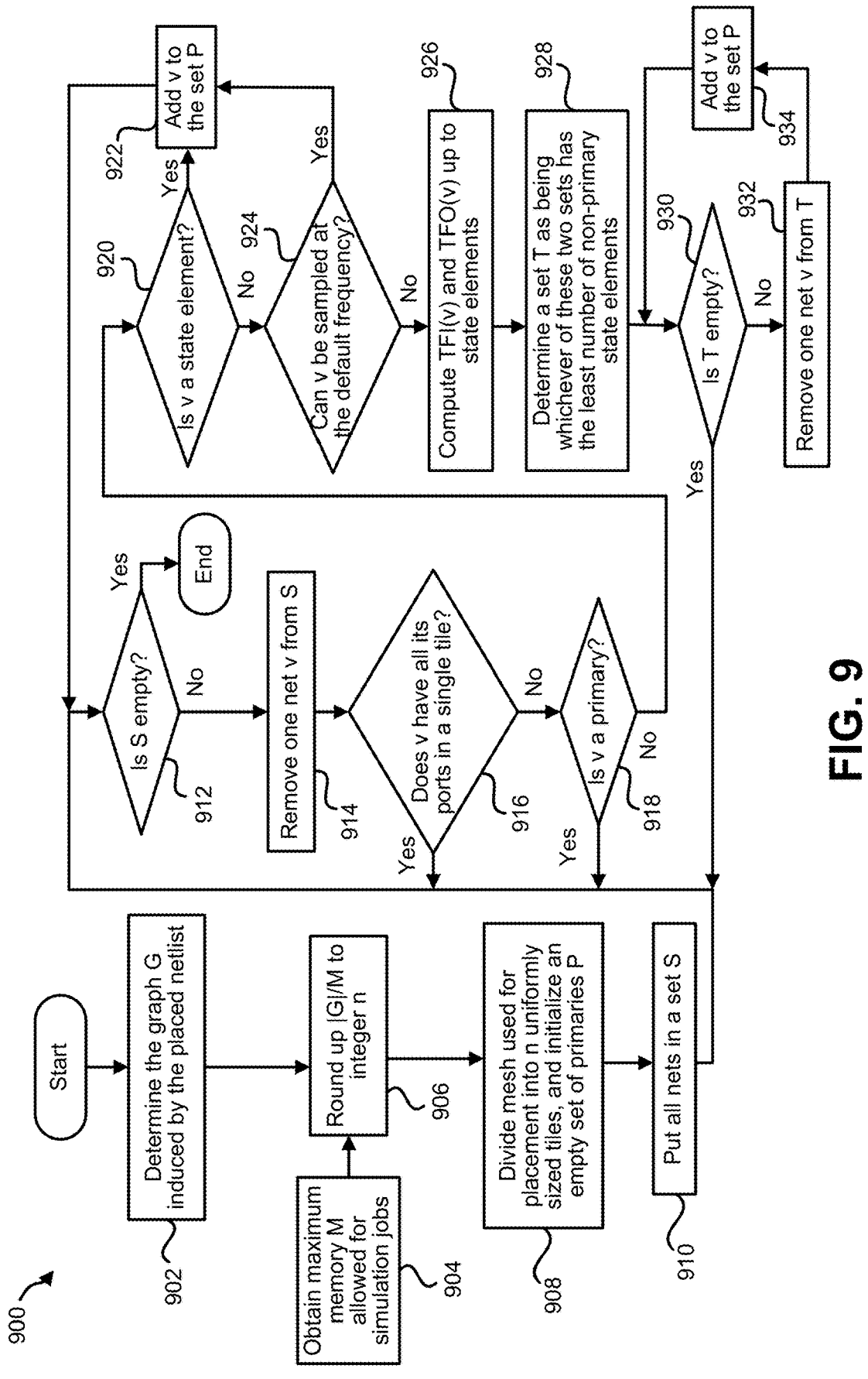
FIG. 9 is a flow diagram illustrating a process for determining a set of primary signals, according to certain embodiments.

It is possible to determine the primaries by considering each pair of partitions separately, one pair at a time. For example, the set of primaries P can be built up by considering every net that crosses the boundary between a given pair of partitions and exploring the TFO and TFI of those nets as needed before considering nets that cross another pair of partitions. However, the nets do not have to be evaluated in any particular order. Accordingly, one method of determining the primaries is to first identify all the nets that cross partitions regardless of where the crossing occurs, then apply a greedy algorithm to evaluate the nets one at a time, exploring the TFI and TFO of each net as needed, until every net that crosses partitions has been evaluated. An example of such an algorithm is shown in FIG. 9, discussed below.

Figure 7:
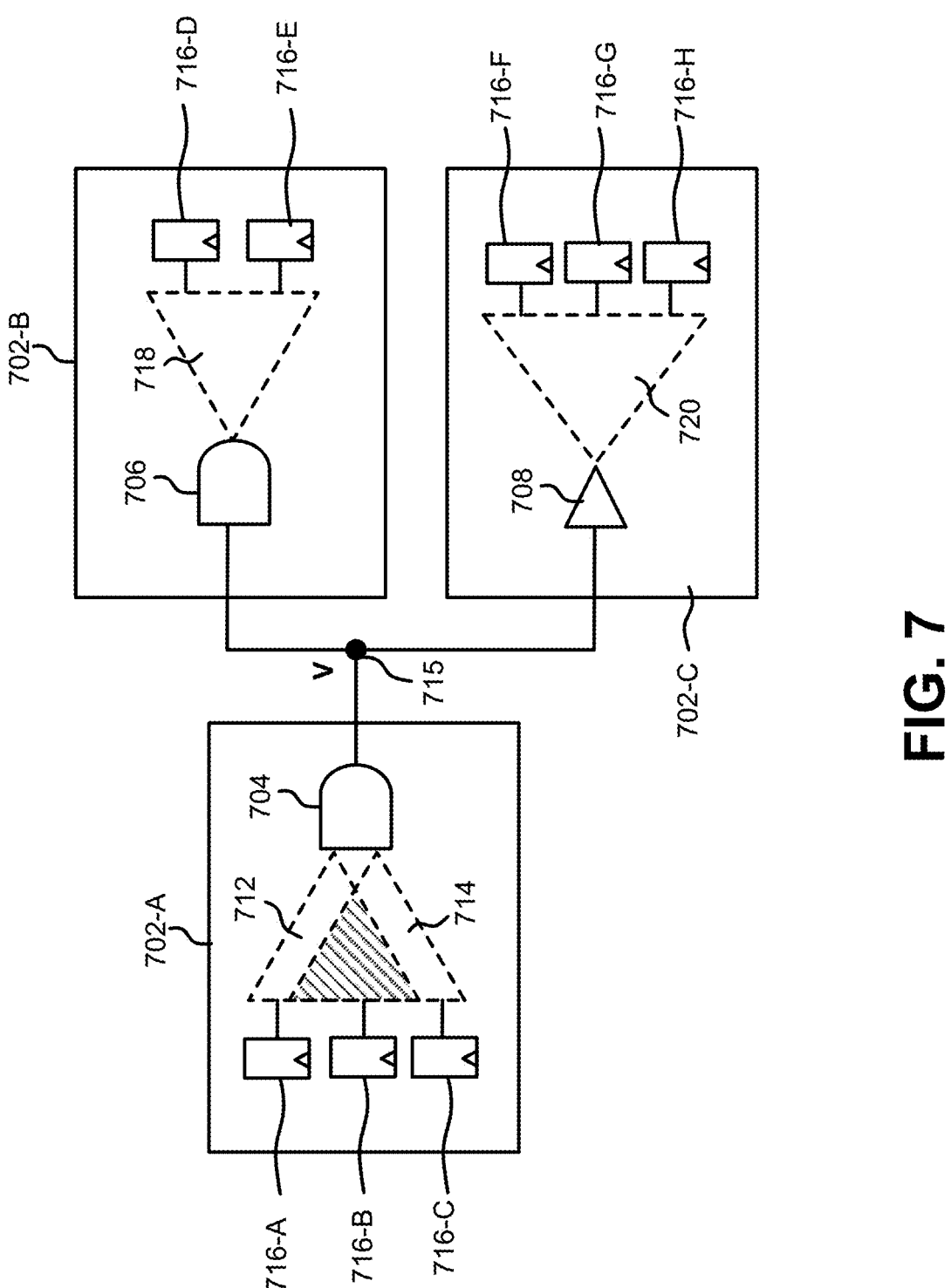
FIG. 7 illustrates a more detailed example of fan-in and fan-out analysis.

FIG. 7 shows a more detailed example of TFI and TFO analysis. In FIG. 7, a net 715 crosses the boundary between a first partition 702-A and a second partition 702-B. The net 715 also crosses the boundary between the partition 702-A and a third partition 702-C. Thus, the net 715 has ports in all three partitions 702-A, 702-B, and 702-C. Specifically, the net 715 corresponds to the output port of an AND gate 704, an input port of an AND gate 706, and an input port of a buffer 708.

The AND gate 704 is located along the TFI of the net 715. Here, the TFI is depicted as having a first part 712 and a second part 714, each part representing a cone of logic leading to a respective input of the AND gate 704. It is appreciated that the TFI may include as many number of parts representing a respective cone logic leading to as many inputs of the AND gate 704, without deviating from the scope of the present disclosure. The bases of the logic cones 712 and 714 are defined by evaluating the TFI up to the first state element encountered along each path in the TFI. In this example, the base of the first logic cone 712 corresponds to the output ports of a pair of flip-flops 716-A and 716-B, and the base of the second logic cone 714 corresponds to the output ports of the flip-flop 716-B plus a flip-flop 716-C. Therefore, the first logic cone 712 and the second logic cone 714 overlap.

The AND gate 706 is located along the TFO of the net 715. The AND gate 706 is connected through a logic cone 718 to a pair of flips-flops 716-D and 716-E. The buffer 708 is also located along the TFO of the net 715. Thus, the TFO extends through both the partition 702-B and the partition 702-C. The buffer 708 leads to three flip-flops 716-F, 716-G, and 716-H, located at the base of a logic cone 720. Each of the aforementioned logic cones (712, 714, 718, and 720) includes non-state holding circuit elements, e.g., combinational logic similar to the AND gate 704, the AND gate 706, and the buffer 708.

The sequential dependency associated with the net 715 is directional and can be characterized as a dependency between partition 702-A and partition 702-B, plus a dependency between partition 702-A and partition 702-C, since the partition 702-A produces the net 715 as an input to the other two partitions 702-B and 702-C. One option to break the dependency between partition 702-A and partition 702-B is to make every state element connected to the bases of the logic cones 712 and 714 primary (i.e., flip-flops 716-A, 716-B, and 716-C). This would also break the dependency between partition 702-A and partition 702-C, thereby completely removing the dependency associated with the net 715. Alternatively, exploring the TFO direction, the dependency associated with the net 715 can be removed by making every state element connected to the bases of the logic cones 718 and 720 primary (i.e., 716-D, 716-E, 716-F, 716-G, and 716-H). The dependencies can be considered one net at a time. One benefit of doing so is that when determining which primaries to add in order to break the dependency associated with a particular net (e.g., 715), it is often possible to take advantage of the fact that some of the signals which can be used to break the dependency have already been made primary, e.g., when adding primaries to break a dependency associated with a different net.

It should be noted that when signals in a TFI or TFO are made primary, this may result in a slight redistribution of the subcircuits such that some subcircuits no longer reside entirely within the area into which they were partitioned. For example, returning to FIG. 6, if the state elements made primary are located along the cut 612, a portion of the subcircuit which was assigned to partition 602-A will now belong to the subcircuit that was assigned to partition 602-B. Therefore, the tiling of space corresponding to the partitions 602 may not correspond to the actual boundaries of the subcircuits to be simulated. However, the subcircuits can be expected to remain approximately balanced in size due to have a similar number of circuit elements. Moreover, the subcircuits can be simulated independently using sequential simulation now that the sequential dependencies have been broken between them, so the reconstruction of the signals in one subcircuit will not depend on signals in the other subcircuit.

FIG. 8 is a flowchart of a method 800 for simulating a circuit design using primary signals captured during emulation, according to certain embodiments. The functionality depicted in FIG. 8 can be implemented using one or more computer systems that are configured to perform a simulation using emulation results extracted from an emulation system. At least one of these computer systems (e.g., a host computer) may be communicatively coupled to the emulation system, e.g., in order to retrieve the emulation results and/or to program the emulation system to, among other things, capture values for a specific set of primary signals. In some embodiments, the method 800 may be performed using the systems and devices shown in FIGS. 1 and 2.

At 802, a circuit design is divided into substantially uniform-sized partitions. The size of the partitions, and therefore the total number of partitions, can be determined based on an amount of memory available for a simulation of the circuit design. For example, a compiler may determine the number n of partitions by estimating the partition size needed to keep the amount of memory used for simulation of an individual partition below some upper limit M, and then dividing the circuit design accordingly. As discussed above, the value of the memory limit M can be user-specified. In some instances, the user may also specify a target value for n. In that case, the compiler may use the target value as a floor for the number of partitions and increase the number of partitions as needed to stay within the memory limit M.

The partitions can be formed using the placement of the circuit design in the emulation space of the emulation system. Accordingly, the functionality in 802 may be performed after a compiler has finished placing the circuit design in preparation for emulation. The emulation space is typically divided into regularly shaped (e.g., rectilinear) tiles, in which case the partitions created in 802 would also be regularly shaped. However, it is possible that the tiles are irregular. For example, a 2D tile can be a polygon with sides of unequal length and different interior angles. Each partition corresponds to one or more placeable areas within the emulation space. For example, if the emulation system includes multiple boards, each board having its own set of FPGAs, then each partition may correspond to a single board, a portion of a board (e.g., four FPGAs), or a group of boards.

At 804, sequential dependencies are identified based on signals that cross the partitions. As discussed above, e.g., in connection with FIG. 4, the signals that cross partitions can correspond to nets in a netlist of the circuit design. For example, in FIG. 2, each net in the placed netlist 207 can be evaluated to determine whether the net extends between partitions. Any net that crosses partitions represents a sequential dependency that needs to be broken in order for the partitions to be simulated independently.

At 806, a set of primary signals is determined that, when provided as input to the simulation, break the sequential dependencies such that each partition can be simulated independently. As discussed above, the set of primary signals (denoted P) can include primary inputs, which are mandatory, as well as signals which are optionally designated primary. Accordingly, the determination in 806 may involve determining which signals to make primary in addition to signals that have already been determined to be primary inputs. Alternatively, the determination in 806 may involve first determining which signals would break the sequential dependencies (e.g., starting from an empty set P), and determining the primary inputs afterwards. Additionally, since removing the dependency associated with a net which crosses partitions (e.g., net 715 in FIG. 7) will sometimes involving making the net itself primary but other times involve making other nets primary (e.g., nets in the TFI or TFO), the set of primary signals P formed as a result of breaking all the sequential dependencies across the entire circuit design is expected to include only a subset of the nets that cross partitions.

At 808, a hardware-based emulation system (e.g., the emulation system 120) is configured to capture values of the set of primary signals determined in 806. The emulation system can be configured, for example, through programming performed by a compiler or run-time module. Once the emulation system has been configured, the emulation system can be instructed to begin the emulation of the circuit design. During the emulation, the emulation system will capture values of the set of primary signals, including any changes in value over the course of simulation. The sampling rate at which the emulation system captures these values may be configurable or fixed.

At 810, the circuit design is simulated (e.g., by the simulation system 230) using the values captured by the emulation system. During the simulation, signals not included in the set of primary signals (i.e., non-primary signals) are reconstructed using values obtained from simulating each partition independently. The values captured by the emulation system are used as input to the simulation, so the primary signals do not have to be computed during simulation.

FIG. 9 is a flow diagram illustrating a process 900 for determining a set of primary signals, according to certain embodiments. The process 900 can be used to implement the functionality in 802, 804, and 806 of FIG. 8 and corresponds to a greedy algorithm approach to determining which signals to make primary.

At 902, the graph G induced by the placed netlist of the circuit design to be simulated is determined. The functionality at 902 may be implemented using a compiler, which can maintain the graph view of the placed netlist as an internal (e.g., in-memory) representation of the circuit design during the compilation process.

At 904, the maximum amount of memory M allowed for simulation jobs is obtained. As discussed above, M can represent the upper bound for the amount of memory consumed by an individual simulation job (e.g., a simulation of a single partition). The value of M can be expressed in any unit of measure for memory, e.g., in megabytes.

At 906, the magnitude of the size of the graph G is divided by M and rounded up to the nearest integer to compute the value for the total number of partitions n into which the circuit design is to be partitioned. The computation in 906 may involve converting the total number of vertices in G into a value representing the amount of memory expected to be consumed by the entire graph.

At 908, the mesh created during placement of the circuit design into emulation space is divided into n uniformly sized tiles. Each tile is a partition representing a subcircuit that will be simulated independently. Additionally, the set of primaries P is initialized at 908 as an empty set.

At 910, every net contained in the placed netlist is put into a set S of candidate primary signals. The set S represents a running list of nets that have yet to be evaluated to determine whether they should be made primary.

At 912, it is determined whether the set S is empty. If so, then there are no nets to evaluate, and the process 900 terminates. Otherwise, the process 900 proceeds to 914.

At 914, a single net v is removed from the set S for evaluation. The nets in the set S do not have to be evaluated in any particular order. However, the set S can be implemented as an ordered list or queue so that the nets are evaluated in sequential order, e.g., the order in which the nets appear within the placed netlist.

At 916, it is determined whether the net v that was removed in 914 has all its ports in a single tile. It so, then the process returns to 912 because the net v does not cross any boundary between tiles. Otherwise, this means that the net v has an input port in one tile and an output port in another tile. In that case, the process proceeds to 918.

At 918, it is determined whether the net v has already been designated as a primary signal. If so, then no action is needed with respect to the net v, and the process returns to 912. Otherwise, the process proceeds to 920.

At 920, it is determined whether the net v is state element. Under the assumption described earlier, in which each net can be identified with the cell that owns its output port, this is equivalent to determining whether the cell associated with the net v is state-holding (e.g., a flip-flop). If the net v is a state element, then the process proceeds to 922. Otherwise, the process proceeds to 924.

At 922, the net v is added to the set of primaries P. The net v is added in this case because no extra timing constraints would be imposed as a result of making a state element primary. Therefore, the net v can be made primary with no loss of emulator performance, e.g., the emulation system does not have to be slowed down by decreasing the operating frequency of the circuit.

If it was determined in 920 that the net v is not a state element, then the net v cannot be automatically made primary, but must instead be evaluated further. Accordingly, at 924, a determination is made as to whether the net v can be sampled at some default frequency. The default frequency can correspond to the sampling rate that the emulation system uses to capture the values of signals. In some instances, the sampling rate is the same as the operating frequency of the circuit itself (e.g., the frequency of the clock signal 504 in FIG. 5). However, the sampling rate and the circuit's operating frequency can be different. The determination at 920 can be performed through timing analysis of the circuit. If the net v can be sampled at the default frequency (e.g., because the value of v is guaranteed to settle by the time of capture), then the process proceeds to 922, and the net v is added to the set of primaries P. In this way, a net v that not a state element can still be made primary. Otherwise, the process proceeds to 926.

At 926, the TFI and TFO of the net v are computed up to state elements. That is, the termination points of the TFI and TFO can be identified by tracing each path leading to or from the net v until the first state element encountered along the path. This produces a first set of state elements in the TFI of the net v and a second set of state elements in the TFO of the net v. Each of these two sets may represent one or more candidate primary signals.

At 928, a set T is determined as being whichever of the two sets of state elements determined in 926 has the least number of non-primary state elements. The determination of the set T minimizes the number of extra primaries being added. For example, the TFI might have six state elements, and the TFO might have ten state elements, but only one out of the six state elements in the TFI is currently primary, whereas seven of the ten state elements in the TFO are currently primary. In this instance, given the choice between adding five new primaries based on the TFI and adding three new primaries based on the TFO, the component determining the primaries (e.g., the compiler) will form the set T using the nets associated with the state elements in the TFO.

At 930, it is determined whether the set T is empty. If so, then there are no primaries to be added with respect to the net v, and the process returns to 912. Otherwise, the process proceeds to 932.

At 932, a single net is removed from the set T and added to the set of primaries P before returning to 930. In this manner, every net in the set T will be added to the set of primaries P, one net at a time. The process 900 ultimately terminates when the determination in 912 indicates that there are no nets left to evaluate, i.e., when the set S becomes empty.

The functionality in the process 900 can be summarized as follows. Given a circuit G placed in a mesh, and a desired memory limit M:

1. Let n be the integer that rounds up |G|/M.
2. Divide the mesh into n tiles of (approximately) the same shape and size.
3. Identify all the nets that are inter-tile. These are nets that contain at least two ports in two different tiles.
4. For each inter-tile net that is not primary:
    i. If that net is the output of a state element, make that net primary.
    ii. Else, if it can be determined that the net can settle at the capture frequency, make that net primary.
    iii. Else visit the TFI and TFO of that net up to state elements. Determine which of the TFI or TFO contains the minimum number of non-primary state elements. Make all those non-primary state elements primary.

Figure 10:
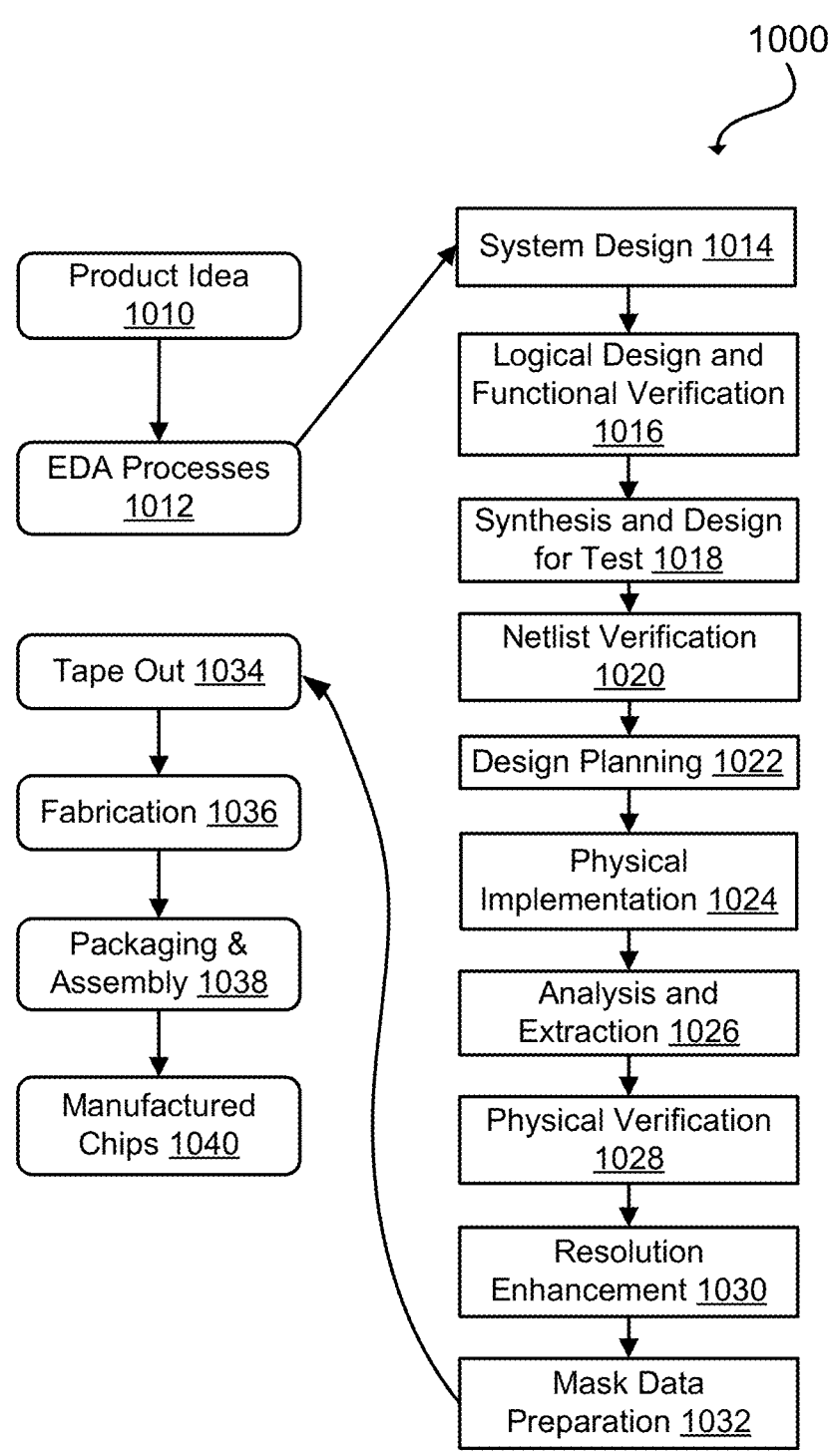
FIG. 10 depicts a flowchart of various processes used during the design and manufacture of an integrated circuit in accordance with some embodiments of the present disclosure.

FIG. 10 illustrates an example set of processes 1000 used during the design, verification, and fabrication of an article of manufacture such as an integrated circuit to transform and verify design data and instructions that represent the integrated circuit. Each of these processes can be structured and enabled as multiple modules or operations. The term "EDA" signifies Electronic Design Automation. These processes start with the creation of a product idea 1010 with information supplied by a designer, information which is transformed to create an article of manufacture that uses a set of EDA processes 1012. When the design is finalized, the design is taped-out 1034, which is when artwork (e.g., geometric patterns) for the integrated circuit is sent to a fabrication facility to manufacture the mask set, which is then used to manufacture the integrated circuit. After tape-out, a semiconductor die is fabricated 1036 and packaging and assembly processes 1038 are performed to produce the finished integrated circuit 1040.

Specifications for a circuit or electronic structure may range from low-level transistor material layouts to high-level description languages. A high-level of representation may be used to design circuits and systems, using a hardware description language (HDL) such as VHDL, Verilog, SystemVerilog, SystemC, MyHDL or OpenVera. The HDL description can be transformed to a logic-level register transfer level (RTL) description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 10. The processes described by be enabled by EDA products (or EDA systems).

During system design 1014, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1016, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as "emulators" or "prototyping systems" are used to speed up the functional verification.

During synthesis and design for test 1018, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1020, the netlist is checked for compliance with timing constraints and for correspondence with the HDL code. During design planning 1022, an overall floor plan for the integrated circuit is constructed and analyzed for timing and top-level routing.

During layout or physical implementation 1024, physical placement (positioning of circuit components such as transistors or capacitors) and routing (connection of the circuit components by multiple conductors) occurs, and the selection of cells from a library to enable specific logic functions can be performed. As used herein, the term "cell" may specify a set of transistors, other components, and interconnections that provides a Boolean logic function (e.g., AND, OR, NOT, XOR) or a storage function (such as a flip-flop or latch). As used herein, a circuit "block" may refer to two or more cells. Both a cell and a circuit block can be referred to as a module or component and are enabled as both physical structures and in simulations. Parameters are specified for selected cells (based on standard cells) such as size and made accessible in a database for use by EDA products.

During analysis and extraction 1026, the circuit function is verified at the layout level, which permits refinement of the layout design. During physical verification 1028, the layout design is checked to ensure that manufacturing constraints are correct, such as design rule check (DRC) constraints, electrical constraints, lithographic constraints, and that circuitry function matches the HDL design specification. During resolution enhancement 1030, the geometry of the layout is transformed to improve how the circuit design is manufactured.

During tape-out, data is created to be used (after lithographic enhancements are applied if appropriate) for production of lithography masks. During mask data preparation 1032, the tape-out data is used to produce lithography masks that are used to produce finished integrated circuits.

A storage subsystem of a computer system (such as computer system 1200 of FIG. 12, or host system 1107 of FIG. 11) may be used to store the programs and data structures that are used by some or all of the EDA products described herein, and products used for development of cells for the library and for physical and logical design that use the library.

FIG. 11 depicts a diagram of an example emulation environment 1100. An emulation environment 1100 may be configured to verify the functionality of the circuit design. The emulation environment 1100 may include a host system 1107 (e.g., a computer that is part of an EDA system) and an emulation system 1102 (e.g., a set of programmable devices such as Field Programmable Gate Arrays (FPGAs) or processors). The host system generates data and information by using a compiler 1110 to structure the emulation system to emulate a circuit design. A circuit design to be emulated is also referred to as a Design Under Test (DUT) where data and information from the emulation are used to verify the functionality of the DUT.

The host system 1107 may include one or more processors. In the embodiment where the host system includes multiple processors, the functions described herein as being performed by the host system can be distributed among the multiple processors. The host system 1107 may include a compiler 1110 to transform specifications written in a description language that represents a DUT and to produce data (e.g., binary data) and information that is used to structure the emulation system 1102 to emulate the DUT. The compiler 1110 can transform, change, restructure, add new functions to, and/or control the timing of the DUT.

The host system 1107 and emulation system 1102 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLU-ETOOTH or IEEE 802.11. The host system 1107 and emulation system 1102 can exchange data and information through a third device such as a network server.

The emulation system 1102 includes multiple FPGAs (or other modules) such as FPGAs $1104_1$ and $1104_2$ as well as additional FPGAs to $1104_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1102 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $1104_1$-$1104_N$ may be placed onto one or more boards $1112_1$ and $1112_2$ as well as additional boards through $1112_M$. Multiple boards can be placed into an emulation unit $1114_1$. The boards within an emulation unit can be connected using the backplane of the emulation unit or any other types of connections. In addition, multiple emulation units (e.g., $1114_1$ and $1114_2$ through $1114_K$) can be connected to each other by cables or any other means to form a multi-emulation unit system.

For a DUT that is to be emulated, the host system 1107 transmits one or more bit files to the emulation system 1102. The bit files may specify a description of the DUT and may further specify partitions of the DUT created by the host system 1107 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1107 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1107 and/or the compiler 1110 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1105 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 12:
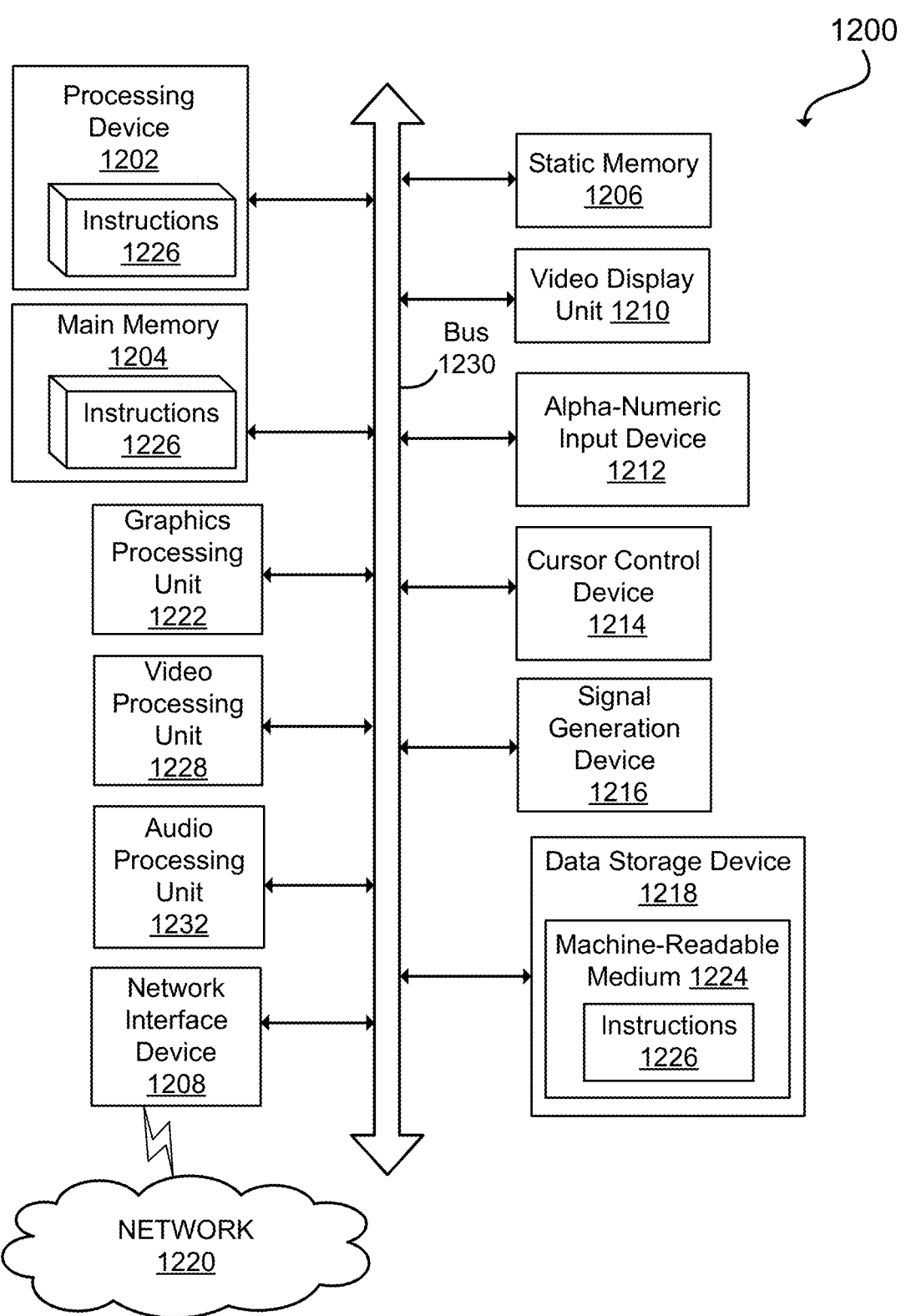
FIG. 12 depicts a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer system comprising:
a hardware emulation system; and
one or more processors communicatively coupled to the hardware emulation system, wherein the one or more processors are configured to:
    divide a circuit design into partitions that are substantially uniform in size;
    identify sequential dependencies based on signals that cross partitions;
    determine a set of primary signals that, when provided as input to a simulation of the circuit design, break the sequential dependencies such that each partition can be simulated independently, wherein the set of primary signals comprises a subset of the signals that cross partitions;
    configure the hardware emulation system to capture values of the set of primary signals during emulation of the circuit design; and
    perform the simulation using the captured values, wherein the simulation comprises reconstructing signals not included in the set of primary signals using values obtained from simulating each partition independently.

2. The computer system of claim 1, wherein the one or more processors are configured to form the partitions using a layout of the circuit design as placed onto an emulation space representing hardware resources of the hardware emulation system.

3. The computer system of claim 2, wherein the emulation space is divided into two-dimensional or three-dimensional tiles, and wherein each partition corresponds to a single tile or a group of adjacent tiles.

4. The computer system of claim 1, wherein the one or more processors are configured to add to the set of primary signals any signal that: (i) crosses partitions, and (ii) is an output of a state element.

5. The computer system of claim 1, wherein the one or more processors are configured to add to the set of primary signals at least one signal that: (i) belongs to a transitive fan-in (TFI) or transitive fan-out (TFO) of a signal that crosses partitions, and (ii) is an output of a state element.

6. The computer system of claim 5, wherein the one or more processors are further configured to:
    identify a first set of one or more candidate primary signals in the TFI of the signal that crosses partitions;
    identify a second set of one or more candidate primary signals in the TFO of the signal that crosses partitions; and
    determine the at least one signal as being either the first set or the second set, whichever contains fewer candidate primary signals.

7. The computer system of claim 1, wherein:

the one or more processors are configured to add to the set of primary signals at least one signal that: (i) crosses partitions, and (ii) is not an output of a state element; and the one or more processors are configured to add the at least one signal based on determining that the at least one signal can be sampled without decreasing an operating frequency of the circuit design during emulation.

8. The computer system of claim 7, wherein to determine that the at least one signal can be sampled without decreasing the operating frequency of the circuit design during emulation, the one or more processors are configured to perform a timing analysis of the circuit design to confirm that a value of the at least one signal has settled by a time the at least one signal is to be sampled.

9. The computer system of claim 1, wherein the one or more processors are configured to simulate at least some of the partitions in parallel, and wherein the one or more processors determine a size of each partition based on a maximum amount of memory to be allocated for simulating a single partition.

10. A method comprising performing the following operations by one or more processors of a computer system:

dividing a circuit design into partitions that are substantially uniform in size;

identifying sequential dependencies based on signals that cross partitions;

determining a set of primary signals that, when provided as input to a simulation of the circuit design, break the sequential dependencies such that each partition can be simulated independently, wherein the set of primary signals comprises a subset of the signals that cross partitions;

configuring a hardware emulation system to capture values of the set of primary signals during emulation of the circuit design; and performing the simulation using the captured values, wherein the simulation comprises reconstructing signals not included in the set of primary signals using values obtained from simulating each partition independently.

11. The method of claim 10, further comprising:

forming, by the one or more processors, the partitions using a layout of the circuit design as placed onto an emulation space representing hardware resources of the hardware emulation system.

12. The method of claim 11, wherein the emulation space is divided into two-dimensional or three-dimensional tiles, and wherein each partition corresponds to a single tile or a group of adjacent tiles.

13. The method of claim 10, wherein determining the set of primary signals comprises adding to the set of primary signals any signal that: (i) crosses partitions, and (ii) is an output of a state element.

14. The method of claim 10, wherein determining the set of primary signals comprises adding to the set of primary signals at least one signal that: (i) belongs to a transitive fan-in (TFI) or transitive fan-out (TFO) of a signal that crosses partitions, and (ii) is an output of a state element.

15. The method of claim 14, further comprising:

identifying a first set of one or more candidate primary signals in the TFI of the signal that crosses partitions;

identifying a second set of one or more candidate primary signals in the TFO of the signal that crosses partitions; and determining the at least one signal as being either the first set or the second set, whichever contains fewer candidate primary signals.

16. The method of claim 10, wherein determining the set of primary signals comprises:

adding to the set of primary signals at least one signal that: (i) crosses partitions, and (ii) is not an output of a state element, wherein the at least one signal is added based on determining that the at least one signal can be sampled without decreasing an operating frequency of the circuit design during emulation.

17. The method of claim 16, wherein determining that the at least one signal can be sampled without decreasing the operating frequency of the circuit design during emulation comprises performing a timing analysis of the circuit design to confirm that a value of the at least one signal has settled by a time the at least one signal is to be sampled.

18. The method of claim 10, wherein at least some of the partitions are simulated in parallel.

19. The method of claim 18, further comprising:

determining a size of each partition based on a maximum amount of memory to be allocated for simulating a single partition.

20. A computer system comprising:

memory storing electronic design automation (EDA) software, wherein the EDA software comprises a simulation program configured to perform a simulation of a circuit design; and one or more processors communicatively coupled to a hardware emulation system, wherein the one or more processors are configured to execute program instructions of the EDA software, the program instructions causing the one or more processors to:

divide the circuit design into partitions that are substantially uniform in size;

identify sequential dependencies based on signals that cross partitions;

determine a set of primary signals that, when provided as input to the simulation, break the sequential dependencies such that each partition can be simulated independently, wherein the set of primary signals comprises a subset of the signals that cross partitions;

configure the hardware emulation system to capture values of the set of primary signals during emulation of the circuit design; and perform the simulation using the captured values, wherein the simulation comprises reconstructing signals not included in the set of primary signals using values obtained from simulating each partition independently.

* * * * *